Patented Sept. 7, 1943

2,328,566

UNITED STATES PATENT OFFICE 2,328,566

COMPOSITION OF MATTER

Irving C. Matthews and William F. Lynch, Rochester, N. Y., assignors to Eastman Kodak Company, Rochester, N. Y., a corporation of New Jersey No Drawing. Application January 24, 1940, Serial No. 315,400

4 Claims. (Cl. 260—3)

This is a continuation in part of our pending application, Serial No. 206,026, filed May 4, 1938, for a Composition of matter. The present invention relates to a composition of matter including two or more resins, and pertains more particularly to a homogeneous mass or mixture containing two or more synthetic resins. Said composition of matter, according to the invention, may be dissolved in solvents to form an all-purpose protective coating or may be used as a plastic for the production of molded articles.

Synthetic resins have been used individually as protective coatings and plastics, but when so used have been lacking in heat resistance, have had low chemical and atmospheric corrosion resistance, have been brittle and/or are subject to checking. When used as or in protective coatings, said individual synthetic resins have poor adhesion and are difficult to apply, such as being subject to cobwebbing during spraying.

The primary object of the present invention is the provision of a composition of matter which is remarkably tough and corrosion-resistant, and which produces a protective film or coating of exceptional adhesion and freedom from checking. Other objects of the invention will be apparent to those skilled in the art from the following disclosure.

Our improved composition of matter comprises a mixture or combination of two or more of the following resins: a reaction product of a polybasic or alpha-beta-dicarboxylic acid anhydride and terpinene; a hydrocarbon or cyclo-olefin resin; a halogenated rubber; and/or a styrol resin.

The reaction product of a polybasic or of an alpha-beta-dicarboxylic acid anhydride and terpinene to be employed in the composition according to the invention may be prepared as follows:

Alpha-terpinene may be obtained by the fractionation of pine oil using the fraction boiling within about the range of 178°–182° C., and about 480 grams of such alpha-terpinene may be heated with about 294 grams of maleic anhydride, or alternatively with an equivalent quantity of maleic acid, at a temperature to cause gentle boiling, say about 150°–200° C. for a period of about five hours. If necessary or desirable, said reaction product may be further purified or refined by distillation under a diminished pressure by which procedure terpinene and impurities will be rendered volatile and so removed from the final reaction product in the still. The preferred reaction product is technically known as 3-isopropyl-6-methyl-3,6-indoethylene-$\Delta^4$-tetrahydro phthalic anhydride. Alternatively other alpha-beta-dicarboxylic acid anhydrides may be used for the foregoing synthesis, such as succinic acid anhydride.

In order further to enhance particular qualities, such as the gloss, flexibility or adhesion, of the final composition of matter, said reaction product of a polybasic acid anhydride and terpinene may, if desired, be modified in anyone of several known ways. For instance, said reaction product may be modified by blending with a drying oil, with another synthetic resin, or with a natural resin such as rosin. Such methods of modification may or may not involve the use of heat, or may include the use of a common solvent and the modifying agent may be introduced before or after the reaction is completed, or may constitute the solvent in which the reaction occurs. Preferably and especially for compounding an all-purpose protective coating, said reaction product of a polybasic acid anhydride and terpinene is modified by heating said reaction product together with natural rosin.

The hydrocarbon or cyclo-olefin resins to be used are preferably of the coumarone-indene type and may be obtained by the catalytic polymerization of resin-forming bodies contained in crude solvent naphtha, and other hydrocarbon liquids, containing bodies polymerizable to form resins of the coumarone-indene type.

Specifically, two commercial forms of hydrocarbon resins have been used satisfactorily in the composition of the invention. One a synthetic hydrocarbon resin including dicyclopentadiene and a few per cent of coumarone-indene and known commercially as "G Resin." The other a synthetic hydrocarbon resin including coumarone-indene with other polymerizable hydrocarbons and known commercially as "Nevillite."

The halogenated rubber to be employed in the production of the composition in accordance with this invention may be made from raw or vulcanized rubber by any of the methods known for its manufacture, and may be utilized in the chlorinated or brominated state. Preferably a chlorinated rubber having a chlorine content of about 67% will be employed, but it will be understood that rubber containing any substantial percentage of chlorine, say as low as 50%, will be usable. The viscosity characteristic of the chlorinated rubber to be used will depend upon the type of composition desired. For a coating composition the chlorinated rubber will preferably have a viscosity of from about 5 to about 10,000 centipoises in 20% solution in xylol at 25° C. Where the chlorinated rubber is to be used in the formation of plastics or molded objects, a much higher viscosity may be used.

The styrol resin may be made by polymerization of styrene to polystyrene and which polymerization may be accomplished by any of the well known methods or by simply heating the liquid styrene to a temperature approximately between 200° and 300° C. and holding the material at that temperature until complete polymerization takes place.

When the aforesaid synthetic resins are mixed in the combinations and proportions disclosed herein, compositions of matter having remarkable characteristics are obtained. A composition of matter comprising a physical mixture of 35-65 parts of a reaction product of a polybasic acid anhydride and terpinene and 65-35 parts of a hydrocarbon resin has good hardness, flexibility and chemical corrosion resistance. A composition of matter of similar properties but of even greater chemical corrosion resistance comprises a physical mixture of 10-30 parts of a reaction product of a polybasic acid anhydride and terpinene, 30-50 parts of a hydrocarbon resin, and 60-40 parts of halogenated rubber. However, a composition of matter having good flexibility and excellent gloss is obtained by eliminating said hydrocarbon resin from the aforementioned three component mixture and by physically combining together 10-40 parts of the reaction product of a polybasic acid anhydride and terpinene and 50-10 parts of halogenated rubber. Also a composition having outstanding chemical resistance is obtained by omitting the reaction product from said three component mixture and by physically mixing 10-40 parts of hydrocarbon resin and 50-10 parts of halogenated rubber.

A composition of matter having exceptional hardness, good flexibility, and chemical and weather corrosion resistance comprises a physical mixture of 10-30 parts of the reaction product of a polybasic acid anhydride and terpinene, 20-40 parts of a hydrocarbon resin, and 70-50 parts of a polystyrol resin. By eliminating the hydrocarbon resin and compounding 20-80 parts of a reaction product of a polybasic anhydride and terpinene with 80-20 parts of polystyrene, a composition of matter is obtained which has good hardness and adhesion and which has particularly good weather resistance. On the other hand, the reaction product may be omitted from said three component mixture, such composition of matter will then comprise a physical mixture of 20-80 parts of a hydrocarbon resin and 80-20 parts of polystyrene, has improved hardness and chemical resistance and protective coating solutions made therefrom may be more easily applied.

The hydrocarbon resin in each instance may be either the coumarone-indene resin or may be the hydrocarbon resin composed primarily of dicyclopentadiene but the dicyclopentadiene resin is preferred because of better adhesion and particularly for compositions which are to be subjected to ultra-violet light.

The following examples will further illustrate the nature of this invention, which, however, is not restricted thereto, and will further indicate the particular characteristics and advantageous properties of the various combinations of the aforementioned synthetic resins.

*Example 1*

A composition of matter comprising a reaction product of alpha-beta-dicarboxylic acid anhydride and terpinene and a hydrocarbon resin is preferably prepared by physically mixing equal parts of the reaction product of maleic acid anhydride with alpha-terpinene and either of said cyclo-olefin resins. To form a lacquer, the mixture may be dissolved in a suitable quantity of a solvent, such as a solvent comprising 50% toluene, 25% xylene, 12½% amyl acetate, and 12½% coal tar solvent naphtha. The resulting solution is a clear lacquer which is stable for storage. The film formed from this lacquer possesses excellent gloss, and is durable for interior use.

*Example 2*

The composition of matter comprising a reaction product of alpha-beta-dicarboxylic acid anhydride and alpha-terpinene, a hydrocarbon resin, and halogenated rubber is preferably prepared by physically mixing 50 parts of chlorinated rubber, 40 parts of the cyclo-olefin resin and 20 parts of the reaction product of maleic acid anhydride and alpha-terpinene. For use as a coating, the foregoing mixture is dissolved in a suitable quantity of the solvent mixture mentioned in Example 1 to form a clear lacquer which gives a film of outstanding corrosion resistance. However, such corrosion resistance is considerably enhanced by the addition of 30-50 parts of a suitable inert pigment, such as graphite or titanium dioxide, and grinding for 24 to 48 hours in a standard ball mill.

If a protective coating or plastic of greater hardness and/or adhesion to metal is desired, the cyclo-olefin resin may be eliminated from this Example 2 to give a composition of matter comprising a physical mixture of equal parts of a reaction product of maleic acid anhydride and alpha-terpinene and of chlorinated rubber, either in a suitable solvent mixture or in a properly plasticized solid state.

On the other hand, if a protective coating or plastic possessing extreme resistance to prolonged immersion in aqueous solutions of various reagents is required, the reaction product of maleic acid anhydride and alpha-terpinene may be omitted from this Example 2 to give a composition of matter comprising a homogeneous physical mixture of equal parts of chlorinated rubber and cyclo-olefin resin and which may be dissolved or plasticized to provide a soft and pliable protective coating or plastic.

*Example 3*

The composition of matter according to the invention and comprising a reaction product of alpha-beta-dicarboxylic acid anhydride and alpha-terpinene, a hydrocarbon resin, and a styrol resin is preferably prepared by physically mixing 20 parts of the reaction product of maleic acid anhydride and alpha-terpinene, 30 parts of cyclo-olefin resin and 60 parts of polystyrene. For use as a lacquer, said mixture may be dissolved in an adequate quantity of the solvent combination of Example 1 or an equivalent solvent. Films formed of such lacquer are exceptionally hard, and have great resistance to corrosion. However, such corrosion resistance is markedly increased when the cyclo-olefin resin is in the form of dicyclopentadiene. Films formed from this modified mixture have been found to resist the action of strong oxidizing reagent, notably silver nitrate solution.

If a protective coating or plastic of equivalent weather resistance and good heat resistance is desired, the hydrocarbon resin may be omitted and a composition of matter is prepared preferably by mixing equal parts of the reaction product of a polybasic acid anhydride and a terpinene and of polystyrene. On the other hand, a composition of good chemical corrosion resistance and readily applied as a lacquer is composed of a homogeneous physical mixture preferably of equal parts of polystyrene and the dicyclopentadiene type of hydrocarbon resin.

Although the solvent mixture herein disclosed has been very successfully employed, it is to be understood that the ingredients and proportions of the mixtures may be varied considerably within the ranges given, and for instance if slow drying films or slow drying adhesives are required the solvent mixture may be modified by the addition or substitution of comparatively high boiling solvents which are compatible with the other ingredients used. On the other hand, as is known, quick drying films or adhesives are obtained by the addition or substitution of comparatively low boiling solvents to the solvent mixture.

Having now particularly described our invention, what we desire to secure by Letters Patent of the United States and we claim is:

1. As a composition of matter, a physical mixture comprising 10–30 parts of reaction product of an alpha-beta-dicarboxylic acid anhydride and terpinene, 30–50 parts of a coumarone-indene cyclo-olefine resin, and 60–40 parts of a halogenated rubber.

2. As a composition of matter, a physical mixture comprising 10–30 parts of a reaction product of an alpha-beta-dicarboxylic acid anhydride and terpinene, 30–50 parts of dicyclopentadiene resin, and 60–40 parts of a halogenated rubber.

3. As a composition of matter suitable as a base for a protective coating, a physical mixture comprising 10–30 parts of a reaction product of maleic anhydride and alpha-terpinene, 30–50 parts of dicyclopentadiene resin, 60–40 parts of a chlorinated rubber, and an organic solvent for said ingredients.

4. As a composition of matter according to claim 1, a homogeneous mass comprising a physical mixture substantially of 20 parts of a modified reaction product of an alpha-beta-dicarboxylic acid anhydride and terpinene, 40 parts of a coumarone-indene cyclo-olefine resin and 50 parts of a chlorinated rubber.

IRVING C. MATTHEWS.
WILLIAM F. LYNCH.